United States Patent
Shi et al.

(10) Patent No.: US 11,670,030 B2
(45) Date of Patent: Jun. 6, 2023

(54) ENHANCED ANIMATION GENERATION BASED ON VIDEO WITH LOCAL PHASE

(71) Applicant: Electronic Arts Inc., Redwood City, CA (US)

(72) Inventors: Mingyi Shi, Hong Kong (CN); Yiwei Zhao, Sunnyvale, CA (US); Wolfram Sebastian Starke, Edinburgh (GB); Mohsen Sardari, Redwood City, CA (US); Navid Aghdaie, San Jose, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 67 days.

(21) Appl. No.: 17/305,229

(22) Filed: Jul. 1, 2021

(65) Prior Publication Data
US 2023/0005203 A1 Jan. 5, 2023

(51) Int. Cl.
*G06T 13/40* (2011.01)
*G06T 7/70* (2017.01)
(Continued)

(52) U.S. Cl.
CPC ............... *G06T 13/40* (2013.01); *G06T 7/20* (2013.01); *G06T 7/70* (2017.01); *H04N 5/272* (2013.01);
(Continued)

(58) Field of Classification Search
None
See application file for complete search history.

(56) References Cited

U.S. PATENT DOCUMENTS 5,274,801 A 12/1993 Gordon
5,548,798 A 8/1996 King
(Continued)

FOREIGN PATENT DOCUMENTS

CN 102509272 A 6/2012
CN 103546736 A 1/2014
(Continued)

OTHER PUBLICATIONS

T. Geijtenbeek et al. (Interactive Character Animation Using Simulated Physics: A State-of-the-Art Review), Computer Graphics forum, vol. 31, 2012 (Year: 2012).*
(Continued)

*Primary Examiner* — Yanna Wu
(74) *Attorney, Agent, or Firm* — Knobbe, Martens, Olson & Bear, LLP

(57) ABSTRACT

Embodiments of the systems and methods described herein provide a dynamic animation generation system that can apply a real-life video clip with a character in motion to a first neural network to receive rough motion data, such as pose information, for each of the frames of the video clip, and overlay the pose information on top of the video clip to generate a modified video clip. The system can identify a sliding window that includes a current frame, past frames, and future frames of the modified video clip, and apply the modified video clip to a second neural network to predict a next frame. The dynamic animation generation system can then move the sliding window to the next frame while including the predicted next frame, and apply the new sliding window to the second neural network to predict the following frame to the next frame.

20 Claims, 9 Drawing Sheets

(51) Int. Cl.
*G06T 7/20* (2017.01)
*H04N 5/272* (2006.01)
(52) U.S. Cl.
CPC .............. *G06T 2207/10016* (2013.01); *G06T 2207/20084* (2013.01); *G06T 2207/30196* (2013.01); *G06T 2207/30221* (2013.01)

(56) References Cited

U.S. PATENT DOCUMENTS

| | | |
|---|---|---|
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,117,134 B1 | 8/2015 | Geiss et al. |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,858,700 B2 | 1/2018 | Rose et al. |
| 9,947,123 B1 | 4/2018 | Green |
| 9,984,658 B2 | 5/2018 | Bonnier et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,198,845 B1 | 2/2019 | Bhat et al. |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,726,611 B1 | 7/2020 | Court |
| 10,733,765 B2 | 8/2020 | Andreev |
| 10,755,466 B2 | 8/2020 | Chamdani et al. |
| 10,792,566 B1 | 10/2020 | Schmid |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 2002/0054054 A1 | 5/2002 | Sanbe |
| 2002/0089504 A1 | 7/2002 | Merrick et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0149516 A1 | 7/2006 | Bond et al. |
| 2006/0217945 A1 | 9/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0277497 A1 | 11/2010 | Dong et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0269540 A1 | 11/2011 | Gillo et al. |
| 2011/0292055 A1 | 12/2011 | Hodgins et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0275521 A1* | 11/2012 | Cui .............. G06T 7/20 |
| | | 375/E7.125 |
| 2012/0303343 A1 | 11/2012 | Sugiyama et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0311885 A1 | 11/2013 | Wang et al. |
| 2014/0002463 A1 | 1/2014 | Kautzman et al. |
| 2014/0198106 A1 | 7/2014 | Sumner et al. |
| 2014/0198107 A1 | 7/2014 | Thomaszewski et al. |
| 2014/0327694 A1 | 11/2014 | Cao et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0217723 A1 | 7/2016 | Kim et al. |
| 2016/0307369 A1 | 10/2016 | Freedman et al. |
| 2016/0314617 A1 | 10/2016 | Forster et al. |
| 2016/0354693 A1 | 12/2016 | Yan et al. |
| 2017/0132827 A1 | 5/2017 | Tena et al. |
| 2017/0301310 A1 | 10/2017 | Bonnier et al. |
| 2017/0301316 A1 | 10/2017 | Farell |
| 2018/0043257 A1 | 2/2018 | Stevens |
| 2018/0122125 A1 | 5/2018 | Brewster |
| 2018/0165864 A1 | 6/2018 | Jin et al. |
| 2018/0211102 A1 | 7/2018 | Alsmadi |
| 2018/0239526 A1 | 8/2018 | Varanasi et al. |
| 2019/0139264 A1 | 5/2019 | Andreev |
| 2019/0392587 A1 | 12/2019 | Nowozin et al. |
| 2020/0294299 A1 | 9/2020 | Rigiroli et al. |
| 2020/0394806 A1 | 12/2020 | Payne et al. |
| 2021/0019916 A1 | 1/2021 | Andreev |
| 2021/0217184 A1 | 7/2021 | Payne et al. |
| 2021/0335004 A1* | 10/2021 | Zohar .............. G06T 11/60 |
| 2022/0254157 A1* | 8/2022 | Fu .............. G06T 7/248 |
| 2023/0010480 A1* | 1/2023 | Li .............. H04L 67/535 |

FOREIGN PATENT DOCUMENTS

| | | |
|---|---|---|
| CN | 105405380 A | 3/2016 |
| CN | 105825778 A | 8/2016 |

(56) References Cited

FOREIGN PATENT DOCUMENTS

| | | |
|---|---|---|
| JP | 2018-520820 A | 8/2018 |
| JP | 2019-162400 A | 9/2019 |

OTHER PUBLICATIONS

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computación y Sistemas 18.4 (2014): 651-664.

Hu G, Chan CH, Yan F, Christmas W, Kittier J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures Up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

McAdams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse, Soraia Raupp, and Daniel Thalmann. "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, Sergio, et al. "Reducing memory requirements for diverse animated crowds." Proceedings of Motion on Games. ACM, 2013.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.

Sifakis, Eftychios D., "Fem Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

(56) References Cited

OTHER PUBLICATIONS

Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.

\* cited by examiner

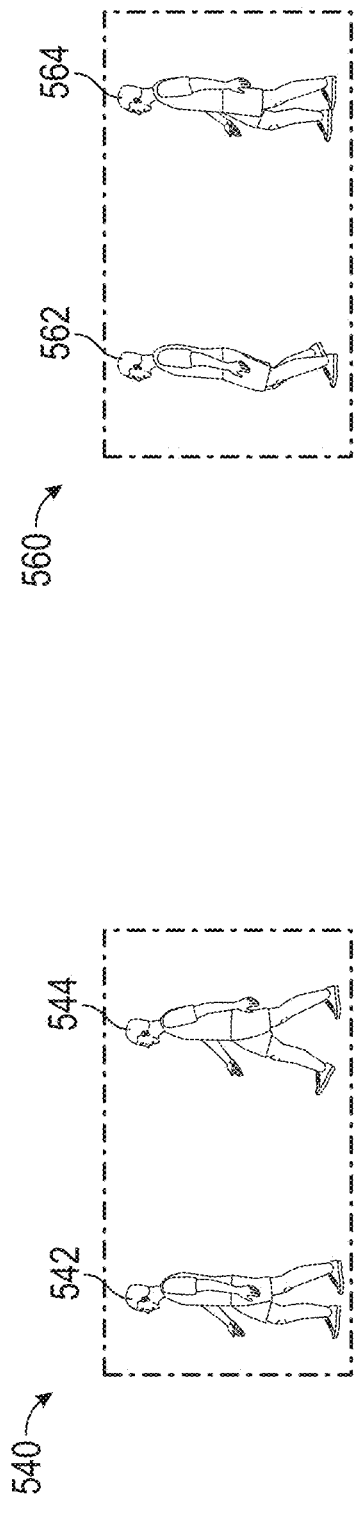

ENHANCED ANIMATION GENERATION BASED ON VIDEO WITH LOCAL PHASE

TECHNICAL FIELD

The present disclosure relates to systems and techniques for animation generation. More specifically, this disclosure relates to machine learning techniques for dynamically generating animation of characters from motion capture video.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game developers. As an example, electronic game developers may be required to create very rich, and detailed, models of characters. As another example, electronic game designers may be required to create fluid, lifelike, movements of the characters.

With respect to the example of movement, characters may be designed to realistically adjust their arms, legs, and so on, while traversing an in-game world. In this way, the characters may walk, run, jump, and so on, in a lifelike manner. With respect to a sports electronic game, substantial time may be spent ensuring that the characters appear to mimic real-world sports players. For example, electronic game designers may spend substantial time fine-tuning movements of an underlying character model. Movement of a character model may be, at least in part, implemented based on movement of an underlying skeleton. For example, a skeleton may include a multitude of objects (e.g., bones or joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running via adjustment of specific objects which form a character model's legs. This hand-tuned technique to enable movement of a character results in substantial complexity and usage of time.

SUMMARY OF EMBODIMENTS

The systems, methods, and devices of this disclosure each have several innovative aspects, no single one of which is solely responsible for the all of the desirable attributes disclosed herein.

Particular embodiments of the subject matter described in this specification can be implemented so as to realize one or more of the following advantages. Utilizing the techniques described herein, realistic motion may be rapidly generated for real life character models. For example, the realistic motion can be configured for use in electronic games. As will be described, a machine learning model may be trained based on motion capture information to generate local motion phase. Pose information can be determined based on video input. Subsequently, a window of frames can be used to predict the next frame and a predicted local motion phase for the next frame. The window of frames can be updated to include the next frame and the predicted local motion phase to be used to predict the following frame. Advantageously, the character animations can perform motions far smoother than traditional systems and the dynamic animation generation system can improve the quality of the animations when the initial prediction of pose has missing pose information in one or more frames of the real life video.

One embodiment discloses a computer-implemented method for dynamically generating animation of characters from real life motion capture video, the method comprising: accessing motion capture video, the motion capture video including a motion capture actor in motion; inputting the motion capture video to a first neural network; receiving pose information of the motion capture actor for a plurality of frames in the motion capture video from the first neural network; identifying a first window of frames of the motion capture video, wherein the first window of frames comprises a current frame, one or more past frames to the current frame, and one or more future frames to the current frame; inputting the first window of frames of the motion capture video to a second neural network, wherein the second neural network predicts the next frame from the current frame; receiving as output of the second neural network a first predicted frame and a first local motion phase corresponding to the first predicted frame, wherein the first predicted frame comprises the predicted frame following the current frame; identifying a second window of frames, wherein the second window of frames comprises the generated first predicted frame; inputting the second window of frames and the first local motion phase to the second neural network; and receiving as output of the second neural network a second predicted frame and a second local motion phase corresponding to the second predicted frame, wherein the second predicted frame comprises the predicted frame following the first predicted frame.

In some embodiments, the computer-implemented method further comprises overlaying the pose information on the motion capture video to generate a modified motion capture video, wherein identifying a first window of frames comprises a first window of frames of the modified motion capture video.

In some embodiments, the motion capture video comprises a video of a real-life person in motion.

In some embodiments, the pose information comprises velocity information corresponding to joints of the motion capture actor.

In some embodiments, the second window of frames comprises one or more past frames to the first predicted frame, and one or more future frames to the first predicted frame.

In some embodiments, the second window of frames drops the oldest frame from the first window of frames.

In some embodiments, the first window of frames comprises sampled frames of the motion capture video at a predefined time threshold.

In some embodiments, the first window of frames comprises a current frame, and the same number of past frames and future frames to the current frame, wherein the second window of frames drops the oldest frame from the first window of frames.

In some embodiments, the motion capture video is captured from a camera on a user's mobile device.

In some embodiments, the motion capture video comprises a video of a real-life sporting event.

In some embodiments, the first local motion phase includes phase information for each joint of the motion capture actor.

In some embodiments, the first local motion phase includes phase information for each bone of the motion capture actor.

Some embodiments include a system comprising one or more processors and non-transitory computer storage media storing instructions that when executed by the one or more processors, cause the one or more processors to perform operations comprising: accessing motion capture video, the motion capture video including a motion capture actor in motion; inputting the motion capture video to a first neural network; receiving pose information of the motion capture actor for a plurality of frames in the motion capture video from the first neural network; identifying a first window of frames of the motion capture video, wherein the first window of frames comprises a current frame, one or more past frames to the current frame, and one or more future frames to the current frame; inputting the first window of frames of the motion capture video to a second neural network, wherein the second neural network predicts the next frame from the current frame; receiving as output of the second neural network a first predicted frame and a first local motion phase corresponding to the first predicted frame, wherein the first predicted frame comprises the predicted frame following the current frame; identifying a second window of frames, wherein the second window of frames comprises the generated first predicted frame; inputting the second window of frames and the first local motion phase to the second neural network; and receiving as output of the second neural network a second predicted frame and a second local motion phase corresponding to the second predicted frame, wherein the second predicted frame comprises the predicted frame following the first predicted frame.

In some embodiments, the operations further comprise overlaying the pose information on the motion capture video to generate a modified motion capture video, wherein identifying a first window of frames comprises a first window of frames of the modified motion capture video.

In some embodiments, the motion capture video comprises a video of a real-life person in motion.

In some embodiments, the pose information comprises velocity information corresponding to joints of the motion capture actor.

In some embodiments, the second neural network comprises an convolutional neural network.

In some embodiments, the second neural network comprises an LSTM neural network.

Some embodiments include a non-transitory computer storage media storing instructions that when executed by a system of one or more processors, cause the one or more processors to perform operations comprising: accessing motion capture video, the motion capture video including a motion capture actor in motion; inputting the motion capture video to a first neural network; receiving pose information of the motion capture actor for a plurality of frames in the motion capture video from the first neural network; identifying a first window of frames of the motion capture video, wherein the first window of frames comprises a current frame, one or more past frames to the current frame, and one or more future frames to the current frame; inputting the first window of frames of the motion capture video to a second neural network, wherein the second neural network predicts the next frame from the current frame; receiving as output of the second neural network a first predicted frame and a first local motion phase corresponding to the first predicted frame, wherein the first predicted frame comprises the predicted frame following the current frame; identifying a second window of frames, wherein the second window of frames comprises the generated first predicted frame; inputting the second window of frames and the first local motion phase to the second neural network; and receiving as output of the second neural network a second predicted frame and a second local motion phase corresponding to the second predicted frame, wherein the second predicted frame comprises the predicted frame following the first predicted frame.

In some embodiments, the operations further comprise overlaying the pose information on the motion capture video to generate a modified motion capture video, wherein identifying a first window of frames comprises a first window of frames of the modified motion capture video.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 5A, 5B, 5C, and 5D illustrate additional embodiments of differences with the local motion phase not in use, and with local motion phase in use according to some embodiments.

DETAILED DESCRIPTION

Overview

Figure 2A:
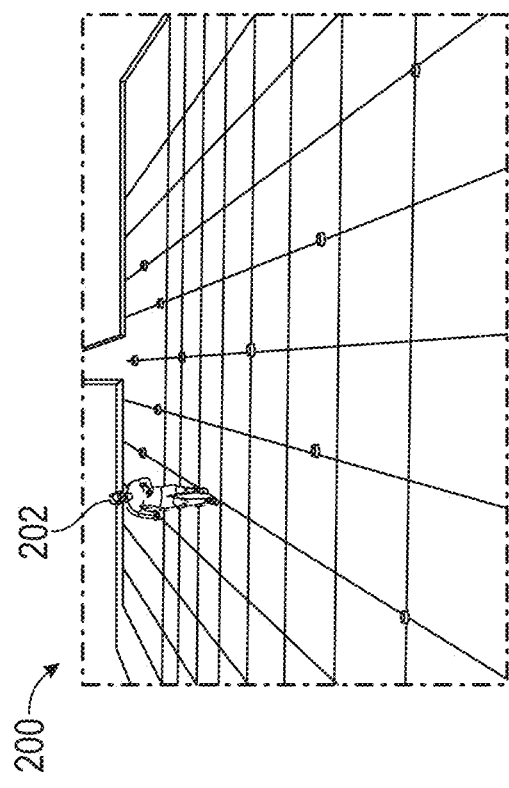
FIGS. 2A-2H illustrate example animation generation by the dynamic animation generation system according to some embodiments.

This specification describes, among other things, technical improvements with respect to generation of motion for characters configured for use in electronic games. As will be described, a system described herein (e.g., the dynamic animation generation system) may implement a machine learning model to generate local phase information based on analyses of motion capture information. The dynamic animation generation system can then process a sliding window of frames to a second machine learning model to generate the next predicted frame and the local motion phase associated with the next predicted frame. The dynamic animation generation system can slide the window over in time to now include the next predicted frame while dropping the oldest frame, and the local motion phase associated with the next predicted frame, and apply the new window in the neural network to generate the frame following the next predicted frame and the local motion phase. Advantageously, the system may perform substantially automated analyses of the motion capture information such that complex machine learning labeling processes may be avoided. The dynamic animation generation system can combine local motion phase techniques with human motion reconstruction from captured real life video. While electronic games are described, it may be appreciated that the techniques described herein may be applied generally to movement of character models. For example, animated content (e.g., TV shows, movies) may employ the techniques described herein.

Reconstruction of human motion from real life video is a promising technology for many businesses to generate animation content. When traditional systems reconstruct human motion using real life captured video, these traditional systems receive a real life video clip, extract human motion by determining what the person is doing and/or what kind of motion the human is performing, and determine location of joints of the human. While traditional systems have many advantages, such as a simple set-up, low cost, and applicability to different video resources, these traditional approaches have technical challenges, such as resulting in blurred or obstructed human video input causing discontinuities and an unsmoothed prediction of next frames. The resulting video can be very unrealistic and contain a lot of noise or disconnects in joints or even animation character.

Moreover, traditional techniques that generate realistic motion for character models heavily rely upon designers adjusting character models to define different types of motion. For example, to define running, a designer may string together certain adjustments of joints on a skeleton of a character model. In this example, the designer may adjust the knees, cause a movement of the arms, and so on. While this may allow for motion to be generated, it may also involve a substantial burden on the designer.

A first example technique in these traditional systems to, at least in part, automate generation of character motion, may include using software to automatically adjust a skeleton. For example, templates of running may be pre-defined. In this example, a designer may select a running template which may cause adjustment of the joints on a skeleton. Thus, the designer may more rapidly generate motion for characters in an in-game world. However, this first example technique may lack the realism of real-world movement. For example, since different templates are being selected, the lifelike differences in movement between real-world persons is lost. Moreover, the quality of the animation is limited to the quality of these templates. Furthermore, the prediction of frames in the human motion is also limited to the type of movement in these templates. For example, traditional systems that use templates may generate animations of running that are very similar to these templates.

Motion may be defined, at least in part, based on distinct poses of an in-game character. As an example, each pose may represent a discrete sample of the motion to be performed by the in-game character. For this example, the pose may identify positions of bones or joints of the in-game character. Thus, if motion is to depict running, each pose may represent a snapshot of the running. For example, a first frame generated by an electronic game may include the in-game character with both feet on a surface within the game world. As another example, a second frame may include the in-game character beginning to move one of the feet upwards. It may be appreciated that subsequent frames may include the in-game character moving forward in a running motion.

To generate motions for in-game characters, electronic game designers are increasingly leveraging motion capture studios. For example, a motion capture studio may be used to learn the realistic gait of an actor as he/she moves about the motion capture studio. Specific portions of the actor, such as joints or bones, may be monitored during this movement. Subsequently, movement of these portions may be extracted from image or video data of the actor. This movement may then be translated onto a skeleton or rig for use as an underlying framework of one or more in-game characters. The skeleton or rig may include bones, which may be adjusted based on the motion capture images or video. In this way, the skeleton or rig may be animated to reproduce motion performed by the actor.

While motion capture studios allow for realistic motion, they are limited in the types of motion able to be reproduced. For example, the above-described skeleton may be animated to reproduced motions which were specifically performed by the actor. Other motions may thus need to be manually created by an electronic game designer. For example, and with respect to a sports electronic game, a real-life basketball player may be used as an actor to perform common basketball motions. While this actor may perform a wide breadth of motions typically performed during a basketball game, as may be appreciated there are other motions which will not be recorded. For example, these other motions may be produced naturally by the actor during a real-world basketball game depending on locations of opponents, the actor's current stamina level, a location of the actor with respect to the basketball court, and so on.

In contrast, the techniques described herein allow for the rapid generation of character animation based on automated analyses of motion capture information. For example, an actor may be placed in a motion capture studio or the dynamic animation generation system may receive data on a real life soccer game. The actor may then perform different movements, and movement of different portions of the actor (e.g., joints) may be stored by a system. Additionally, contact with an external environment may be recorded. Thus, the specific foot fall pattern used by an upper echelon boxer or basketball player may be recorded. Additionally, the specific contact made by an actor's hands with respect to a basketball, football, and so on, may be recorded. This recorded information may be used to increase a realism associated with animation generation. In some embodiments, motion can be generated for biped and/or human characters. In some embodiments, motion can be generated for quadruped characters.

In some embodiments, the dynamic animation generation system can improve on the quality of human reconstruction by combining human video input with local motion phase information. The dynamic animation generation system can first predict rough motion in real life video by applying real life capture data in a first model, such as a neural network, to receive the rough motion. The rough motion can include pose data, such as local motion phase. The machine learning model may be trained using local phase information extracted based on how individual body parts of a motion capture actor contacts external objects. This phase information may therefore represent local bone and/or joint phases corresponding to bones (e.g., arms, legs, hands) and/or joints (e.g., elbows, knees, knuckles) of the actor, and may be used to enhance the machine learning model's temporal alignment, and segmentation, of realistic motion.

In some embodiments, by training a machine learning model to generate animation based on motion capture information, the model may allow for enhanced nuance associated with the animation. As an example, a real-life wrestler may be used as an actor. In this example, video of the wrestler may be recorded which depicts the wrestler moving about a ring, interacting with an opponent, performing different moves, and so on. The machine learning model may then be trained based on this video, such that the model can reproduce the highly stylized, and personal, movement of the wrestler.

In some embodiments, in a second step, the dynamic animation generation system can process the output of the first model in a second model, such as an autoregression model, which can conditionally update the poses for the entire sequence going forward. The second step can include a model that applies a sliding window. The initial sliding window can include the rough motion data outputted by the first neural network. The model can apply the initial sliding window to predict a predicted pose and local phase information for the next window. Then the window can slide one frame forward which includes the predicted pose and local phase information, and the model can predict the next pose and local phase information.

Example Traditional System Output with Output from the Dynamic Animation Generation System FIGS. 1A-1H illustrate example animation generation by a first neural network to generate rough motions according to some embodiments. The rough motions can include pose data for each frame based on the video. The rough motion data can include a multidimensional signal that includes joint information, such as rotation information for each joint of the human. The rough motions can include calculations for each joint and for each frame in the video. The pose data is overlaid on top of the original video input to generate a modified video input.

FIGS. 2A-2H illustrate example animation generation using the modified video input as input to a second neural network that applies a sliding window according to some embodiments. FIGS. 1A-1H and FIGS. 2A-2H include a real life video capturing a human in motion (in dashed line) and a computer generated animation of the human (in solid line). The real life video can be captured by a studio, camera, or phone, or can be a stream of a real life event, such as a sporting event. The real life video can be a single view of a person performing a certain action or motion.

Figure 2B:
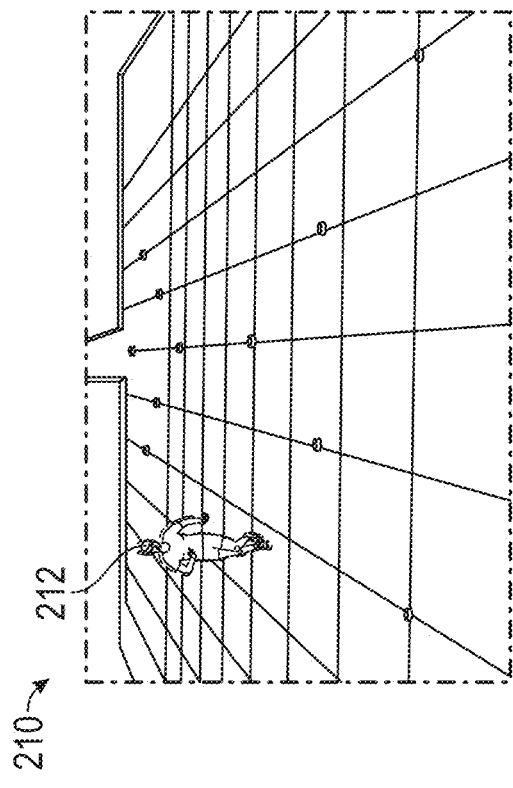
Figure 1A:
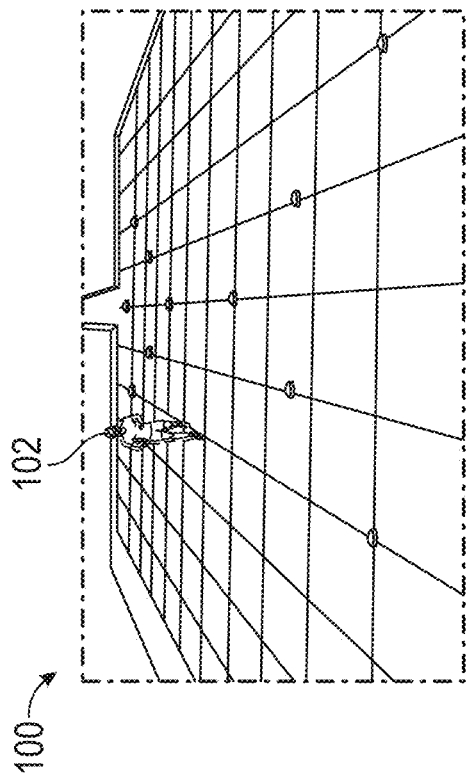
FIGS. 1A-1H illustrate example animation generation by traditional systems according to some embodiments.
Figure 1B:
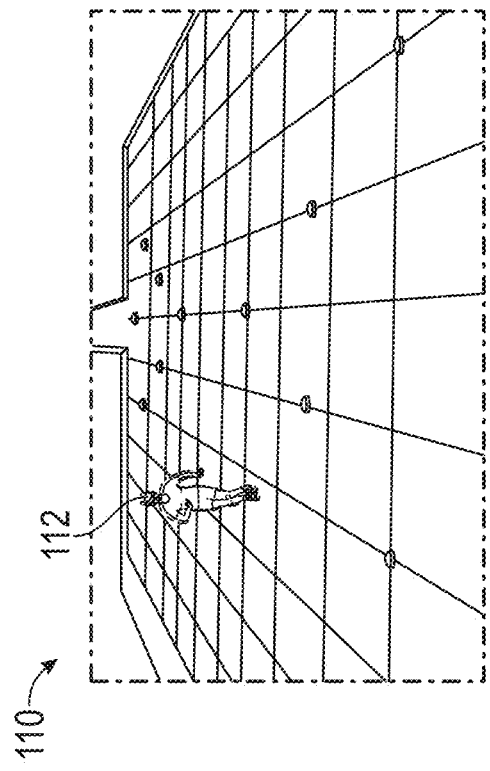

As shown from 100 and 110 of FIGS. 1A-1B and 200 and 210 of FIGS. 2A-2B, there is not much difference in the character animation 102, 112, 202, 212 when the real life person is running in a straight line. One reason for this is that there is not much of an explosive change between the frames. Moreover, traditional systems can simply apply existing "running" templates and generate the character animation as shown in FIGS. 1A-1B.

Figure 1C:
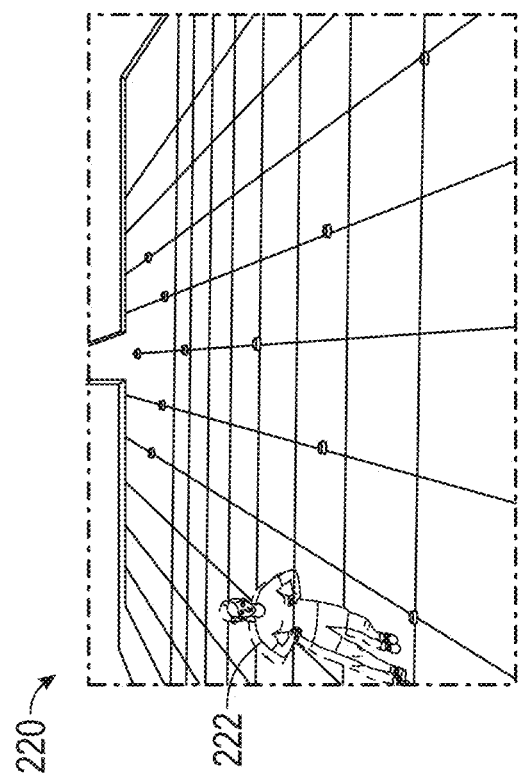
Figure 1D:
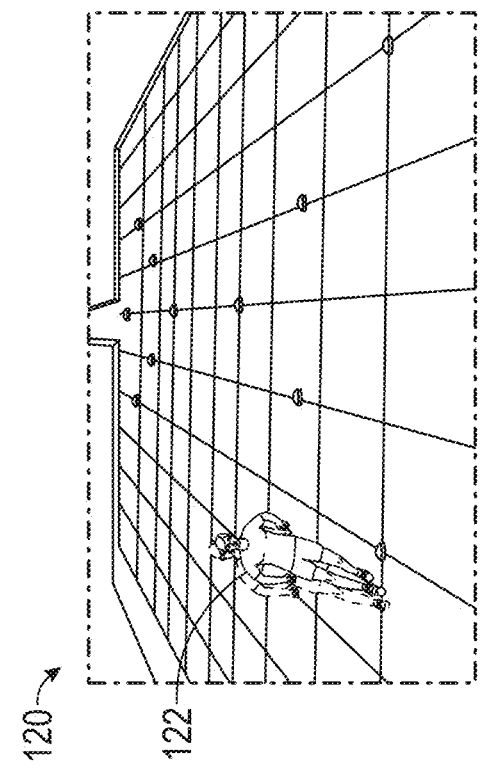

As shown from 120 and 130 of FIGS. 1C-1D, the character animation 122 is an unusual and unrealistic pose of a human running, and character animation 132 is non-existent. There are certain frames where there is no character animation because the system cannot determine pose data when there is a sharp motion, such as a character changing directions sharply. Moreover, the person in the real life video is moving very quickly and the image can sometimes get blurred, causing the system to fail to predict pose data for that frame. Because the first neural network can miss the connection between different frames, there are a few frames where pose data is completely missing. This is unlike FIGS. 1A-1B where the human is moving slowly and the system can recover pose data for every frame. Thus, there is missing joint data for these frames. Although averaging or interpolation between frames can be used. However, such approaches cannot add new details to the recovered signals and the resulting animation loses certain details or result in a blurred or unsmoothed motion.

Figure 2C:
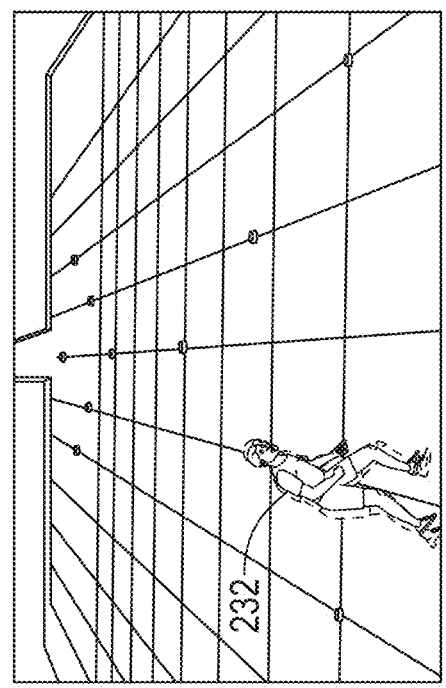
Figure 2D:
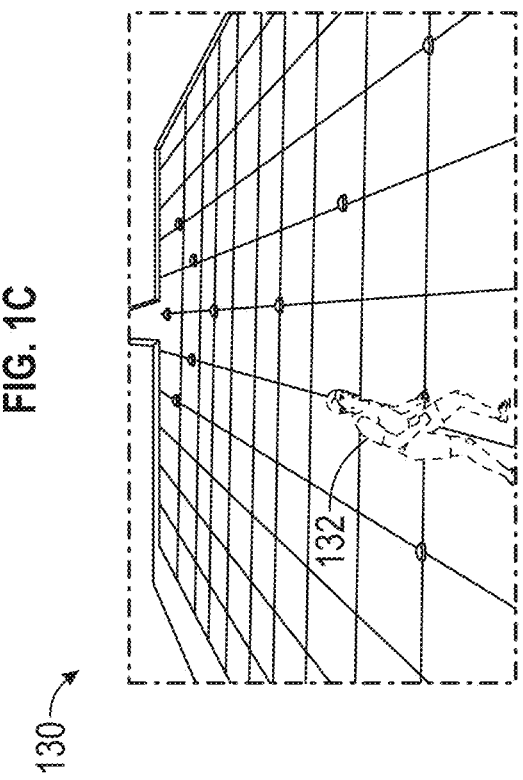

In 220 and 230 of FIGS. 2C-2D, the character animation 222 and 232 have been generated by the second neural network that use the sliding window technique. The neural network can process the sliding window by taking as input, pose data for the past frames and predict the current frame with local phase information. Then the system can move the sliding window by one frame, remove the oldest frame, and add the current frame to generate a new sliding window. The new sliding window can be passed to the neural network to generate the next frame with local phase information.

Figure 1E:
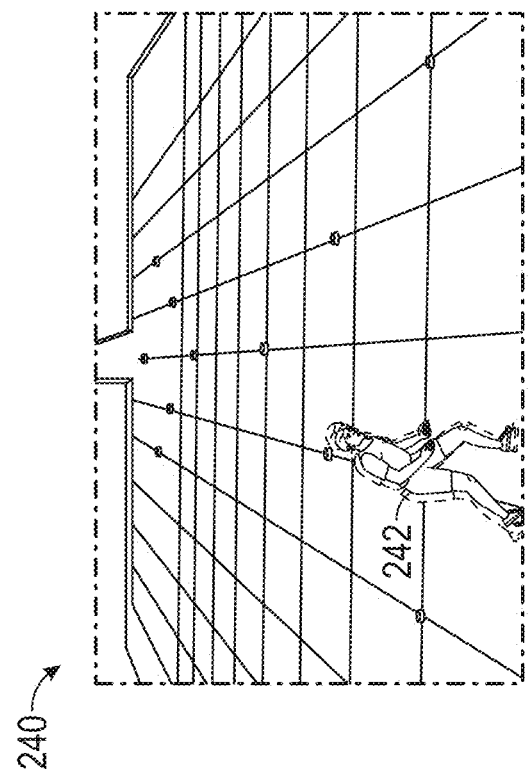
Figure 2E:
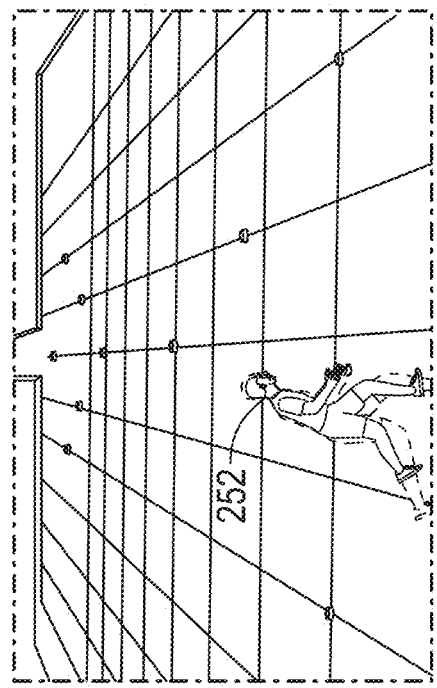
Figure 1F:
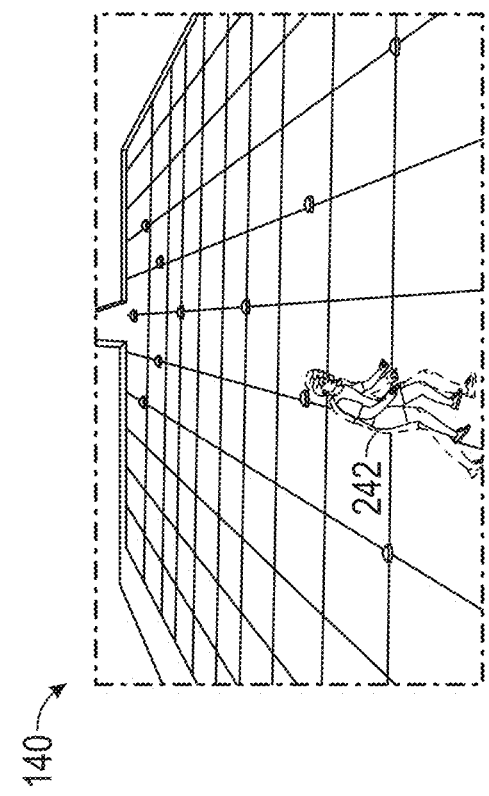
Figure 2F:
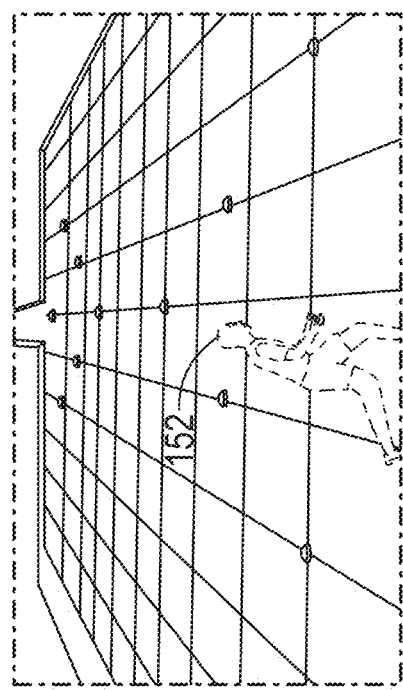
Figure 1G:
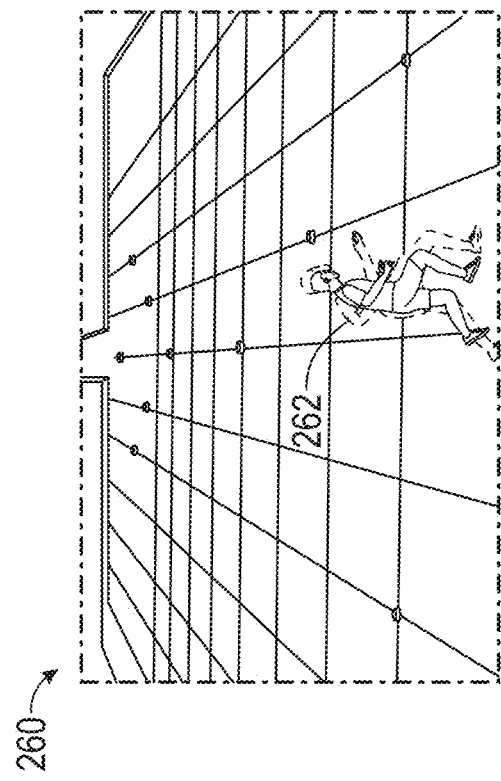
Figure 2G:
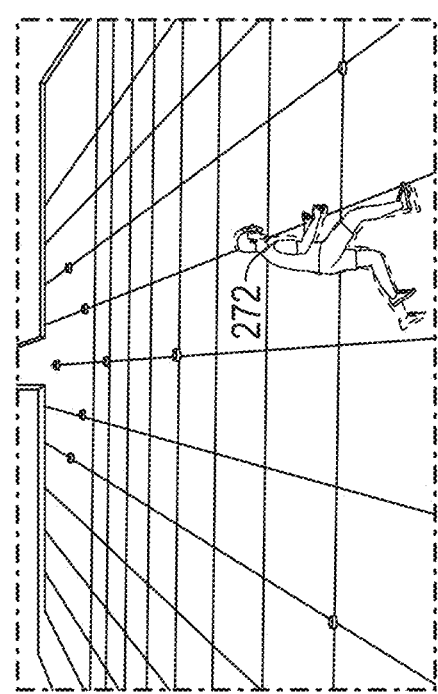
Figure 1H:
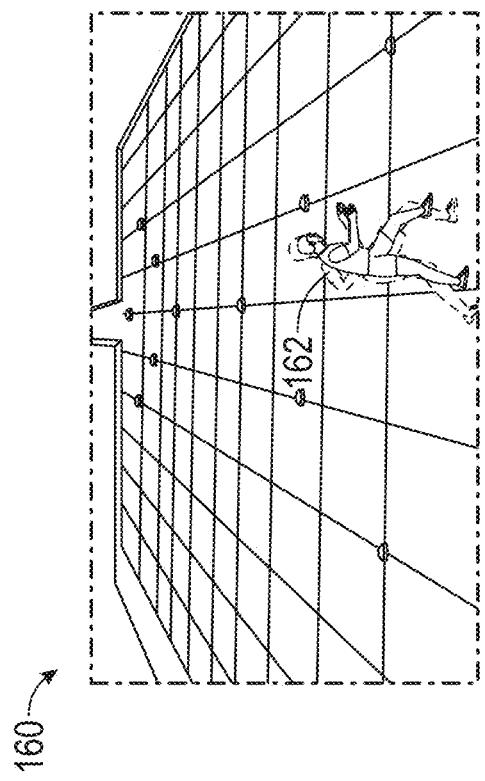
Figure 2H:
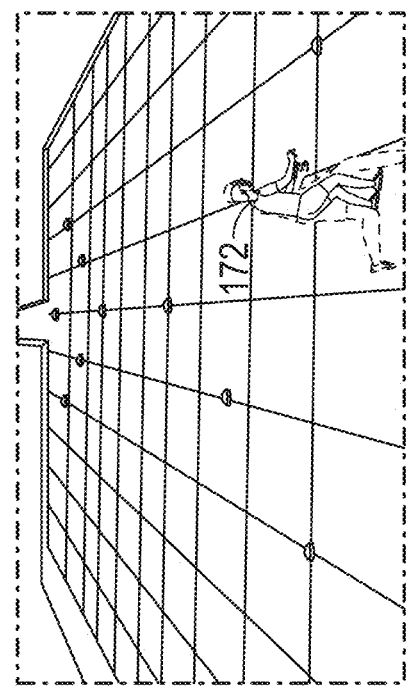

Similar to FIGS. 1D and 1E, as shown in 140, 150, 160, and 170 of FIGS. 1E-1H, the character animations 142, 162, and 170 are unusual and unrealistic poses of a human running, and the character animation 152 is missing completely. However, in 240, 250, 260, and 270 of FIGS. 2E-2G, the character animations 242, 252, 262, 272 have been generated by the second neural network using the sliding window technique and is able to generate a smooth pose of a human running. Moreover, the character animations 242, 252, 262, 272, as well as the other character animations in FIGS. 2A-2D follow the real life person running very closely. Advantageously, the dynamic animation generation system can generate character animations from real life capture video producing a smoother resulting motion, and improves the quality of the generation when the initial prediction of pose data is missing.

Sliding Window of Pose Data to Predict Next Pose Data

Figure 3A:
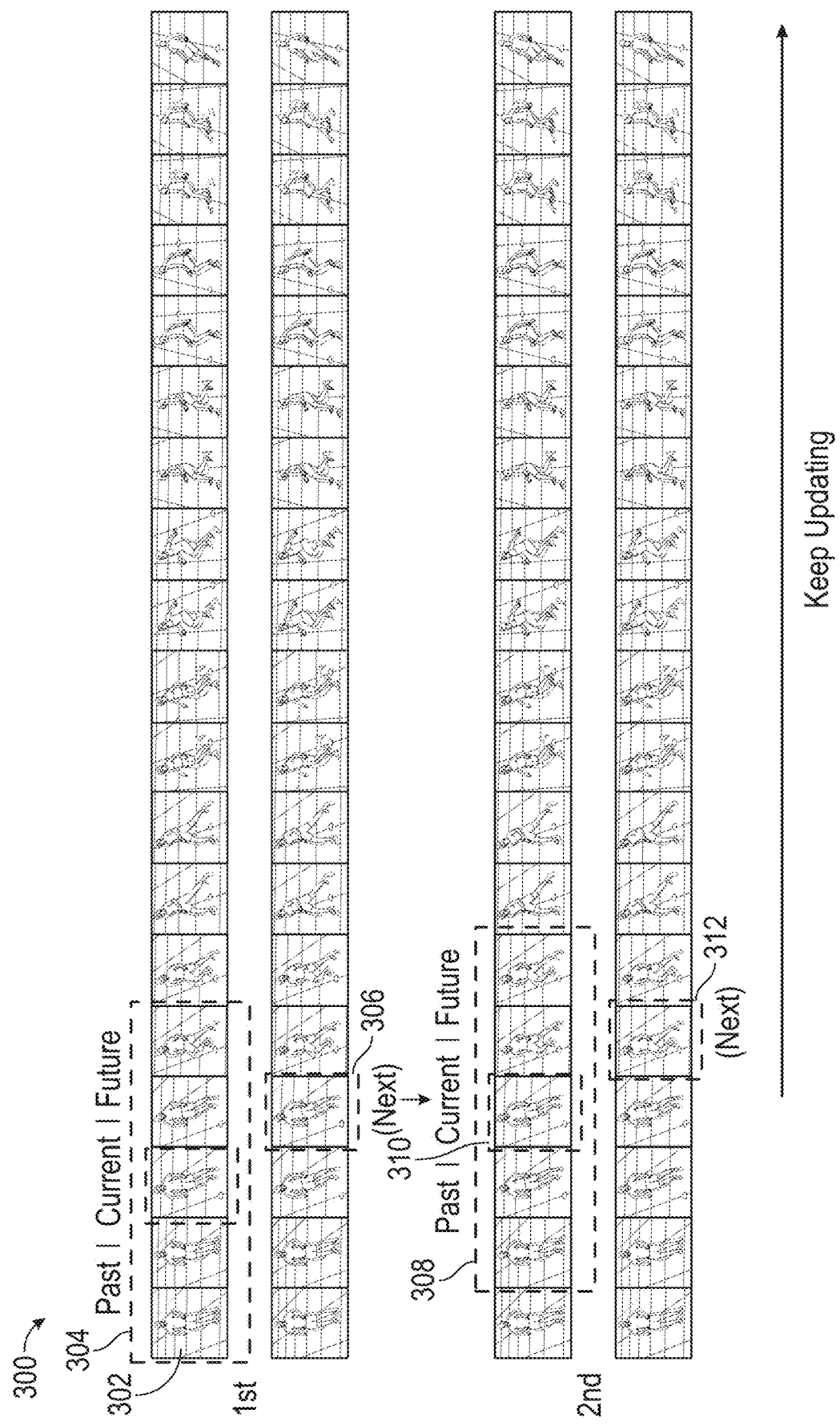
FIG. 3A illustrates an embodiment of a sliding window of past pose data used to predict first pose data in the current frame, and a new sliding window that is adjusted by one frame to predict pose data for the next frame according to some embodiments.
Figure 3B:
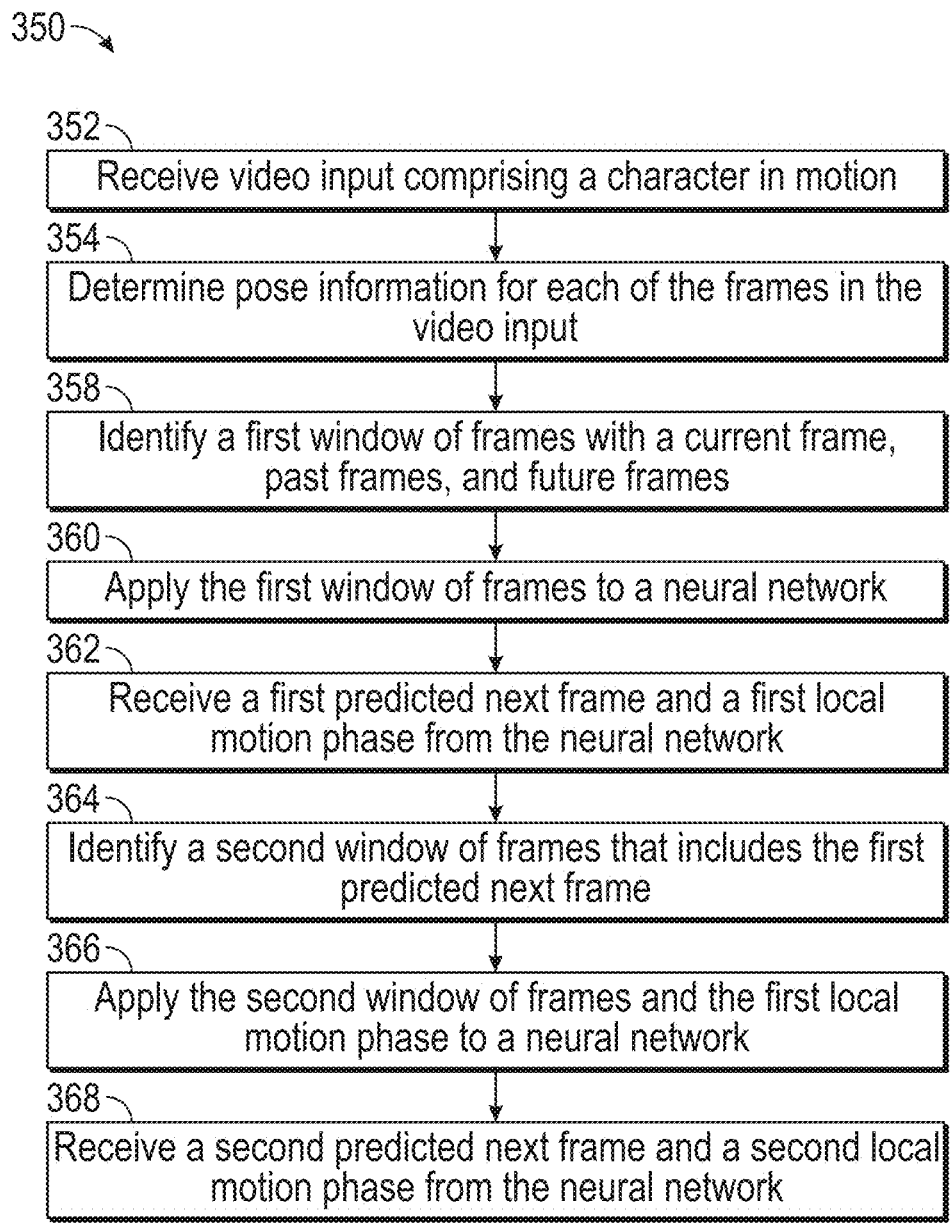
FIG. 3B illustrates a flow diagram of the dynamic animation generation system applying the first and second neural network to generate predicted next frame data according to some embodiments.
Figure 4A:
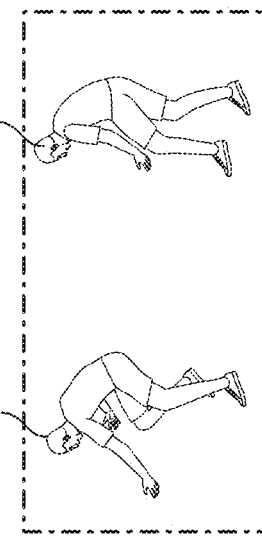
FIGS. 4A, 4B, 4C, and 4D illustrate embodiments of differences with the local motion phase not in use, and with local motion phase in use according to some embodiments.
Figure 4B:
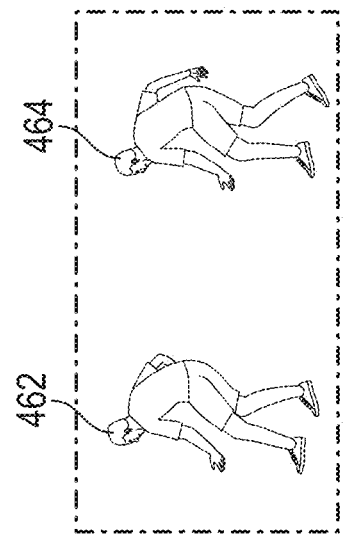
Figure 4C:
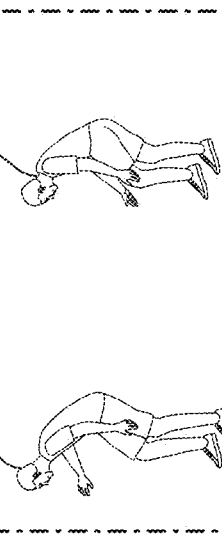
Figure 4D:
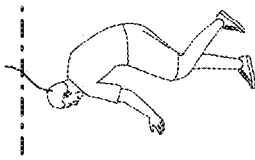

FIG. 3A illustrates an embodiment 300 of a sliding window of past pose data used to predict first pose data in the current frame, and a new sliding window that is adjusted by one frame to predict pose data for the next frame according to some embodiments. FIG. 3B illustrates a flow diagram 350 of the dynamic animation generation system applying the first and second neural network to generate predicted next frame data. For convenience, the flow diagram 350 will be described as being performed by a system of one or more computers (e.g., the dynamic animation generation system).

At block 352, the dynamic animation generation system can receive video input comprising a character in motion, such as a basketball player dribbling toward the hoop. The system accesses motion capture information. The information may be stored according to different motion capture formats, such as BVH and so on. Optionally, the motion capture information may represent image or video data taken at a particular frame rate. Thus, there may be 24, 30, 60, frames per second, which depict an actor moving about a motion capture studio. Optionally, the actor may have markers usable to track portions of the actor's body. Optionally, computer vision techniques may be used to identify specific feature of the actor's body (e.g., hands, arms, and so on). In some embodiments, an external object (e.g., a basketball) may have a marker on, or a sensor within, the object. Optionally, computer vision techniques may be used to analyze positions of the external object in the image or video data. While the description above described use of an actor, in some embodiments video may be obtained of real-world events. For example, video from a real-world sports game may be obtained and analyzed. In this example, a particular player may be analyzed identify specific portions of the player's body. Example portions may include the player's hands, feet, head, and so on.

At block 354, the dynamic animation generation system can input the video input to a first model, such as a first neural network. The first neural network can output pose information for each frame in the video input. The system may generate realistic motion using one or more deep-learning models. An example deep-learning model described herein includes a generative control model usable to inform generation of highly variable, and realistic, animations for characters. For example, the first model may be trained based on local bone and/or joint phases learned from motion capture information of real-world actors.

Machine learning models may be used to enhance generation of motion based on motion capture information. For example, a machine learning model may analyze motion capture information. In this example, the machine learning model may then be used to generate animation for an in-game character which is based on the motion capture information, creating rough motion data. Since these machine learning models may directly output motion data for use in a second neural network (using a sliding window, as described further below) that can generate motion data for animating an in-game character automatically, they may substantially reduce development time of the electronic game. Additionally, since they are trained using motion capture information the output poses may appear lifelike.

In some embodiments, the local motion phase includes phase information for each joint and/or bone of the character. In contrast, phase on a global level (e.g., one phase for the entire character) may not scale well when the character is moving asynchronously or when we want to combine movements for the animation. This is why the dynamic animation generation system can apply local motion phase which is determined on the local level by segmenting movements to joints, bones, limbs, ligaments, etc. Thus, the dynamic animation generation system inputs velocity data specific to joints, bones, limbs, ligaments, into a gaiting function to predict next pose data very granularly.

At block 358, the dynamic animation generation system can identify a sliding window to apply to a second model, such as a second neural network. The dynamic animation generation system can identify an initial window of frames that include a current frame, past frames, and future frames from the modified video input that includes the pose information outputted from the first model overlaid on top of the original real life video clip. For example, the dynamic animation generation system can take the real life video capture 302 of FIG. 3A and generate a sliding window 304 that includes two past frames, a current frame, and two future frames.

At block 360, the dynamic animation generation system can apply the sliding window to the second model to generate a predicted next pose. For example, the sliding window 304 of FIG. 3A can be applied to the second model, and a predicted next pose 306 can be received from the second model. Advantageously, the output of the first neural network can include frames that include very noisy potentially blurred images of the character, and/or missing pose data in certain frames. However, the second neural network is trained to generate next pose data based on the frames within the sliding window. The neural network can be trained to pose data in a predicted next frame even with incomplete or noisy input of frames within the sliding window.

At block 362, the dynamic animation generation system can receive a first predicted next pose 306, and at block 364, the dynamic animation generation system can identify a second window of frames that includes the first predicted next pose. For example, the dynamic animation generation system can receive the predicted next pose 306 of FIG. 3A and a first local motion phase that is outputted by the first neural network. The dynamic animation generation system can then generate a new sliding window that 308 includes pose 310 (which is the same pose as the predicted next pose 306), two past frames and two future frames. The phase information may be determined independently for each of the bones and/or joints. As will be described, phase information for a bone and/or joint may be determined based on contacts by the bone and/or joint with an external environment. For example, an actor's left hand contacting a ball, an opponent, a rim, a net, other portions of the actor, and so on, may be identified using video or images of the actor in the motion capture studio. Contacts with the left hand may be aggregated over a period of time and may be represented as a signal. The signal may, for example, indicate times at which contact occurred.

At block 366, the dynamic animation generation system can apply the second window of frames and the first local motion phase to the same second neural network as in block 360. At block 368, the dynamic animation generation system can receive a second predicted next frame and a second local motion phase from the second neural network. For example, the dynamic animation generation system applies the second window of frames 308 of FIG. 3A to the second neural network to receive a second predicted next frame 312. The dynamic animation generation system continues to repeat the sliding window to generate next predicted frames and local motion phases. The dynamic animation generation system can repeat the sliding window through the entire real life video clip, where for each frame, the local motion phase is predicted and outputted by the second neural network.

In some embodiments, the second neural network is trained by applying training data that includes video clips with characters in motion. The output of the model can then be used to adjust the model, such as based on a comparison between the actual output of the model and the expected output of the model. For example, the trained data can include the precise local motion phase data. Then the model can be trained using the outputted motion and phase information.

In some embodiments, the dynamic animation generation system can sample the real life video input to apply to the neural networks. The dynamic animation generation system can skip frames to generate the sliding window. For example, if the video includes a frame every $\frac{1}{10}^{th}$ of a second, the dynamic animation generation system can take every second of video and apply the video to the first and second neural network, and drop the other 9 frames between each second.

Advantageously since the dynamic animation generation system may directly generate character poses from real life video data, the dynamic animation generation system may allow for substantial storage savings with respect to character animations. For example, prior techniques to generate character animations have relied upon utilization of key-frames or animation clips. In this example, an electronic game may select a multitude of key-frames and interpolate them to generate animation for output to an end-user. These key-frames and animation clips may therefore have to be stored as information for use by the electronic game. This may increase a size associated with the electronic game, such as a download size, an installation size, and so on.

In contrast, the techniques described herein may allow for generation of animation based on use of one or more machine learning models. As may be appreciated, these machine learning models may be represented as weights, biases, and so on, which may be of a substantially smaller size. In this way, an electronic game may have a reduced size, reduced download time, reduced installation time, and so on, as compared to other electronic games.

Sliding Window of Pose Data to Predict Next Pose Data

FIGS. 4A, 4B, 4C, and 4D illustrate embodiments 400, 420, 440, 460 of differences with the local motion phase not in use 402, 422, 442, 462, and with local motion phase in use 404, 424, 444, 464 according to some embodiments. FIGS. 5A, 5B, 5C, and 5D illustrate additional embodiments 500, 520, 540, 560 of differences with the local motion phase not in use 502, 522, 542, 562, and with local motion phase in use 504, 524, 544, 564 according to some embodiments. Similar to FIGS. 5A, 5B, 5C, and 5D, the character animation of 402, 422, 442, and 462 in FIGS. 4A, 4B, 4C, and 4D, without using local motion phase, can be blurred and result in unrealistic motion. The motion from 402 to 422 is unnatural, and the pose in 422 is unrealistic. Moreover, the character animation from 402, 422, 442, and 462 may reach a similar final gesture but cannot find the movement timing accurately. In contrast, the character animation 404, 424, 444, 464 is far more synchronized and the pose is appropriate for the timing of the frames. Thus, the use of local motion phase results in a better predictor of forward timing for specific posses.

Overview of Computing Device

Figure 6:
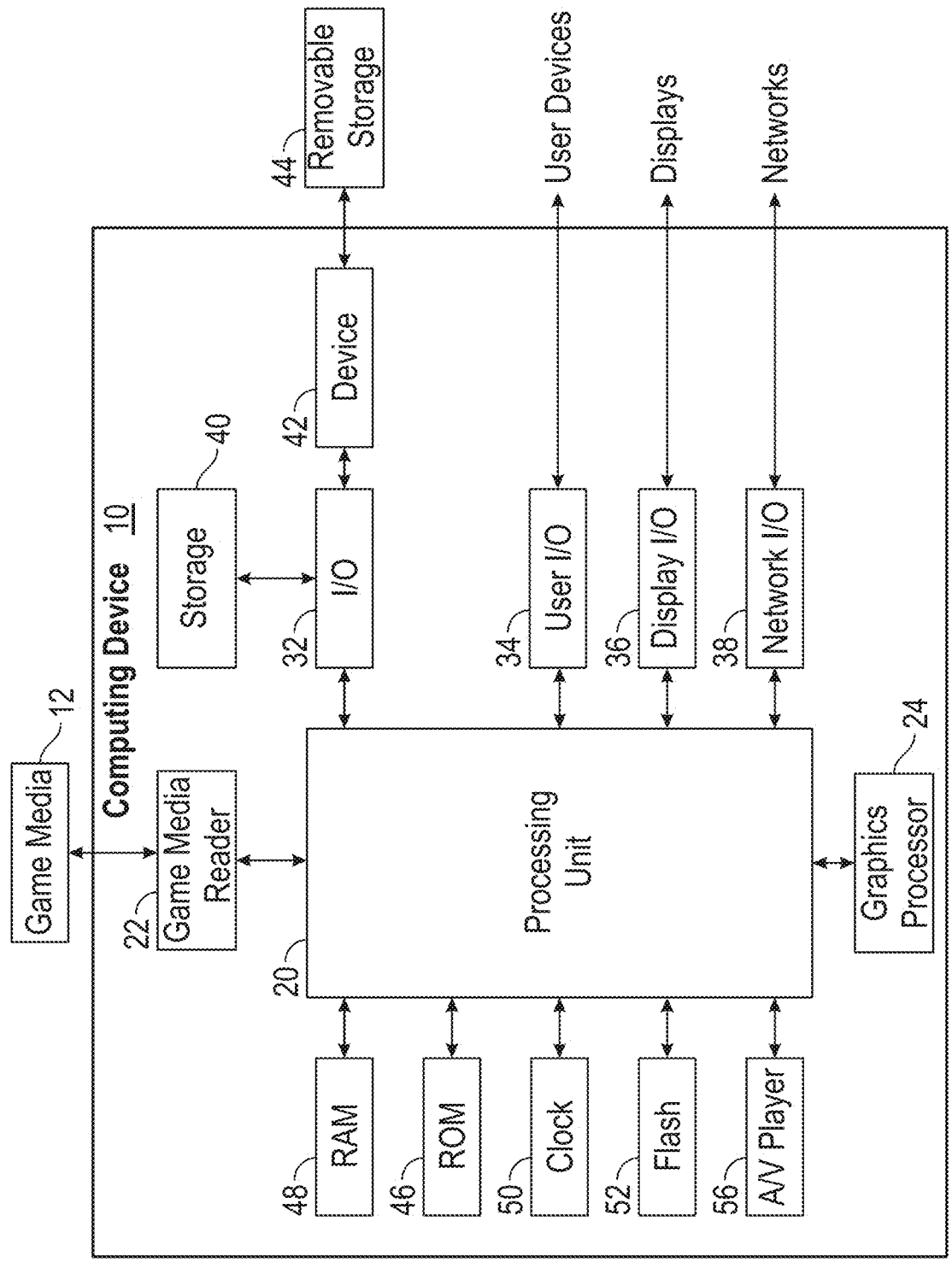
FIG. 6 illustrates an embodiment of computing device that may implement aspects of the present disclosure according to some embodiments.

FIG. 6 illustrates an embodiment of computing device 10 according to some embodiments. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10. The computing device 10 can include one or more components for the interactive computing system 160, and/or a player computing system 152A, 152B. In some embodiments, the interactive computing system 160, and/or a player computing system 152A, 152B can include one or more components of the computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for dynamically generating animation of characters from real life motion capture video, the method comprising:
   accessing motion capture video, the motion capture video including a motion capture actor in motion;
   inputting the motion capture video to a first neural network;
   receiving pose information of the motion capture actor for a plurality of frames in the motion capture video from the first neural network;
   overlaying the pose information on the motion capture video to generate a modified motion capture video;

identifying a first window of frames of the modified motion capture video, wherein the first window of frames comprises a current frame, one or more past frames to the current frame, and one or more future frames to the current frame;

inputting the first window of frames of the modified motion capture video to a second neural network, wherein the second neural network predicts the next frame from the current frame;

receiving, as output of the second neural network, a first predicted frame and a first local motion phase corresponding to the first predicted frame, wherein the first predicted frame comprises the predicted frame following the current frame;

identifying a second window of frames, wherein the second window of frames comprises the generated first predicted frame;

inputting the second window of frames and the first local motion phase to the second neural network; and receiving, as output of the second neural network, a second predicted frame and a second local motion phase corresponding to the second predicted frame, wherein the second predicted frame comprises the predicted frame following the first predicted frame.

2. The computer-implemented method of claim 1, wherein identifying a first window of frames comprises a first window of frames of the modified motion capture video.

3. The computer-implemented method of claim 1, wherein the modified motion capture video comprises a video of a real-life person in motion.

4. The computer-implemented method of claim 1, wherein the pose information comprises velocity information corresponding to joints of the motion capture actor.

5. The computer-implemented method of claim 1, wherein the second window of frames comprises one or more past frames to the first predicted frame, and one or more future frames to the first predicted frame.

6. The computer-implemented method of claim 1, wherein the second window of frames drops the oldest frame from the first window of frames.

7. The computer-implemented method of claim 1, wherein the first window of frames comprises sampled frames of the modified motion capture video at a predefined time threshold.

8. The computer-implemented method of claim 1, wherein the first window of frames comprises a current frame, and the same number of past frames and future frames to the current frame, wherein the second window of frames drops the oldest frame from the first window of frames.

9. The computer-implemented method of claim 1, wherein the modified motion capture video is captured from a camera on a user's mobile device.

10. The computer-implemented method of claim 1, wherein the modified motion capture video comprises a video of a real-life sporting event.

11. The computer-implemented method of claim 1, wherein the first local motion phase includes phase information for each joint of the motion capture actor.

12. The computer-implemented method of claim 1, wherein the first local motion phase includes phase information for each bone of the motion capture actor.

13. A system comprising one or more processors and non-transitory computer storage media storing instructions that when executed by the one or more processors, cause the one or more processors to perform operations comprising:

accessing motion capture video, the motion capture video including a motion capture actor in motion;

inputting the motion capture video to a first neural network;

receiving pose information of the motion capture actor for a plurality of frames in the motion capture video from the first neural network;

overlaying the pose information on the motion capture video to generate a modified motion capture video;

identifying a first window of frames of the modified motion capture video, wherein the first window of frames comprises a current frame, one or more past frames to the current frame, and one or more future frames to the current frame;

inputting the first window of frames of the modified motion capture video to a second neural network, wherein the second neural network predicts the next frame from the current frame;

receiving, as output of the second neural network, a first predicted frame and a first local motion phase corresponding to the first predicted frame, wherein the first predicted frame comprises the predicted frame following the current frame;

identifying a second window of frames, wherein the second window of frames comprises the generated first predicted frame;

inputting the second window of frames and the first local motion phase to the second neural network; and receiving, as output of the second neural network, a second predicted frame and a second local motion phase corresponding to the second predicted frame, wherein the second predicted frame comprises the predicted frame following the first predicted frame.

14. The system of claim 13, wherein identifying a first window of frames comprises a first window of frames of the modified motion capture video.

15. The system of claim 13, wherein the modified motion capture video comprises a video of a real-life person in motion.

16. The system of claim 13, wherein the pose information comprises velocity information corresponding to joints of the motion capture actor.

17. The system of claim 13, wherein the second neural network comprises an convolutional neural network.

18. The system of claim 13, wherein the second neural network comprises an LSTM neural network.

19. A non-transitory computer storage media storing instructions that when executed by a system of one or more processors, cause the one or more processors to perform operations comprising:

accessing motion capture video, the motion capture video including a motion capture actor in motion;

inputting the motion capture video to a first neural network;

receiving pose information of the motion capture actor for a plurality of frames in the motion capture video from the first neural network;

overlaying the pose information on the motion capture video to generate a modified motion capture video;

identifying a first window of frames of the modified motion capture video, wherein the first window of frames comprises a current frame, one or more past frames to the current frame, and one or more future frames to the current frame;

inputting the first window of frames of the modified motion capture video to a second neural network, wherein the second neural network predicts the next frame from the current frame;

receiving, as output of the second neural network, a first predicted frame and a first local motion phase corresponding to the first predicted frame, wherein the first predicted frame comprises the predicted frame following the current frame;

identifying a second window of frames, wherein the second window of frames comprises the generated first predicted frame;

inputting the second window of frames and the first local motion phase to the second neural network; and receiving, as output of the second neural network, a second predicted frame and a second local motion phase corresponding to the second predicted frame, wherein the second predicted frame comprises the predicted frame following the first predicted frame.

20. The non-transitory computer storage media of claim 19, wherein identifying a first window of frames comprises a first window of frames of the modified motion capture video.

* * * * *